(12) United States Patent
Chen et al.

(10) Patent No.: US 10,508,910 B2
(45) Date of Patent: Dec. 17, 2019

(54) OPTICAL MODULE AND METHOD OF MAKING THE SAME

(71) Applicant: Advanced Semiconductor Engineering, Inc., Kaohsiung (TW)

(72) Inventors: Ying-Chung Chen, Kaohsiung (TW); Hsun-Wei Chan, Kaohsiung (TW); Lu-Ming Lai, Kaohsiung (TW); Kuang-Hsiung Chen, Kaohsiung (TW)

(73) Assignee: ADVANCED SEMICONDUCTOR ENGINEERING, INC., Kaosiung (TW)

( * ) Notice: Subject to any disclaimer, the term of this patent is extended or adjusted under 35 U.S.C. 154(b) by 365 days.

(21) Appl. No.: 14/975,083

(22) Filed: Dec. 18, 2015

(65) Prior Publication Data
US 2016/0178366 A1    Jun. 23, 2016

(30) Foreign Application Priority Data
Dec. 22, 2014 (CN) .......................... 2014 1 0802251

(51) Int. Cl.
*G01C 3/08* (2006.01)
(52) U.S. Cl.
CPC ..................................... *G01C 3/08* (2013.01)
(58) Field of Classification Search
CPC ..................................................... G01C 3/08
See application file for complete search history.

(56) References Cited

U.S. PATENT DOCUMENTS

| | | | | |
|---|---|---|---|---|
| 7,995,189 B2* | 8/2011 | Yamaguchi | .......... | G01B 11/026 |
| | | | | 356/3.01 |
| 9,029,818 B2* | 5/2015 | Wong | .................. | H04B 10/802 |
| | | | | 250/551 |
| 2010/0171215 A1 | 7/2010 | Fischer et al. | | |
| 2013/0341537 A1 | 12/2013 | Wong et al. | | |
| 2014/0084307 A1 | 3/2014 | Halbritter | | |
| 2014/0175462 A1 | 6/2014 | Lermer et al. | | |

(Continued)

FOREIGN PATENT DOCUMENTS

| | | |
|---|---|---|
| CN | 1023477242 A | 12/2013 |
| CN | 103608922 A | 2/2014 |

(Continued)

OTHER PUBLICATIONS

Office Action and Search Report for corresponding Chinese Patent Application No. 201410802251.1, dated Dec. 25, 2017, 9 pages.

(Continued)

*Primary Examiner* — Tony Ko
(74) *Attorney, Agent, or Firm* — Foley & Lardner LLP; Cliff Z. Liu

(57) ABSTRACT

An optical module includes a carrier, a light source disposed on an upper side of the carrier, an optical sensor disposed on the upper side of the carrier, and a housing disposed on the upper side of the carrier over the light source and the optical sensor. The housing defines a first aperture exposing at least a portion of the light source and a second aperture exposing at least a portion of the optical sensor. An outer sidewall of the housing includes at least one singulation portion adjacent to the upper side of the carrier and perpendicular to the upper side of the carrier.

27 Claims, 21 Drawing Sheets

(56) References Cited

U.S. PATENT DOCUMENTS

2014/0225147 A1    8/2014  Halbritter et al.
2015/0260829 A1*  9/2015  Wada ...................... G01C 3/24
                                                          356/4.01

FOREIGN PATENT DOCUMENTS

CN        103797580 A    5/2014
TW        201117437 A    5/2011

OTHER PUBLICATIONS

Translation of Search Report for corresponding Chinese Patent Application No. 201410802251.1, dated Dec. 25, 2017, 4 pages.
Office Action and Search Report for corresponding Taiwan Patent Application No. 104143211, dated Sep. 20, 5 pages.
Translation of Search Report for corresponding Taiwan Patent Application No. 104143211, dated Sep. 20, 2 pages.
Office Action for corresponding Chinese Patent Application No. 201410802251.1, dated Aug. 27, 2018, 3 pages.
Office Action for corresponding Chinese Patent Application No. 201410802251.1, dated Mar. 19, 2019 in 4 pages.
Office Action for corresponding Chinese Patent Application No. 201410802251.1, dated Nov. 20, 2018 in 6 pages.
Translation of Search Report for corresponding Chinese Patent Application No. 201410802251.1, dated Nov. 20, 2018 in 4 pages.

* cited by examiner

OPTICAL MODULE AND METHOD OF MAKING THE SAME

CROSS-REFERENCE TO RELATED PATENT APPLICATIONS

This application claims the benefit of P.R.C. (China) Patent Application No. 201410802251.1 filed on 22 Dec. 2014, the contents of which are incorporated herein by reference in their entirety.

BACKGROUND

1. Field

The present disclosure relates to an optical module and a method of making an optical module. The optical module can be used, for example, in electronic products such as mobile phones, digital cameras and tablet computers.

2. Description of the Related Art

An optical module, for example, a proximity sensor, can be used to sense objects near the optical module. The optical module has a lighting source and an optical sensor, and the optical sensor can receive or sense the light (for example, infrared) emitted by the lighting source and reflected by external or nearby objects, to detect a presence of external adjacent objects.

SUMMARY

An optical module includes a carrier, a light source disposed on an upper side of the carrier, an optical sensor disposed on the upper side of the carrier, and a housing disposed on the upper side of the carrier over the light source and the optical sensor. The housing defines a first aperture exposing at least a portion of the light source and a second aperture exposing at least a portion of the optical sensor. An outer sidewall of the housing includes at least one singulation portion adjacent to the upper side of the carrier and perpendicular to the upper side of the carrier.

A method of making an optical module includes (a) affixing a housing matrix module to a tape, the housing matrix module including multiple housings connected with each other, each housing defining apertures; (b) singulating the housing matrix module to separate the housings from each other, leaving the housings attached to the tape, wherein the singulating defines a singulation portion on an outer sidewall of each of the housings; (c) disposing lighting sources and optical sensors at an upper side of a carrier; (d) disposing the singulated housings on the upper side of the carrier, each housing positioned over at least one lighting source and at least one optical sensor such that the lighting source is exposed from a first aperture defined by the housing and the optical sensor is exposed from a second aperture defined by the housing; and (e) singulating the carrier into multiple optical modules, the singulation portion being adjacent to an upper surface of the carrier and perpendicular to the upper surface of the carrier.

A method of making an optical module includes (a) affixing at least one housing matrix module to a tape, the housing matrix module including housings connected with each other, each housing defining apertures; (b) disposing lighting sources and optical sensors at an upper side of a carrier; (c) disposing the housing matrix module at the upper side of the carrier, the housings of the housing matrix module positioned such that a first aperture of each housing exposes at least one lighting source and a second aperture of each housing exposes at least one optical sensor; (d) singulating the housing matrix module and the carrier to form multiple optical modules each including one housing, the one housing including a singulation portion of an outer wall of the housing, the singulation portion being adjacent to an upper surface of the carrier and perpendicular to the upper surface of the carrier.

DETAILED DESCRIPTION

Figure 1:
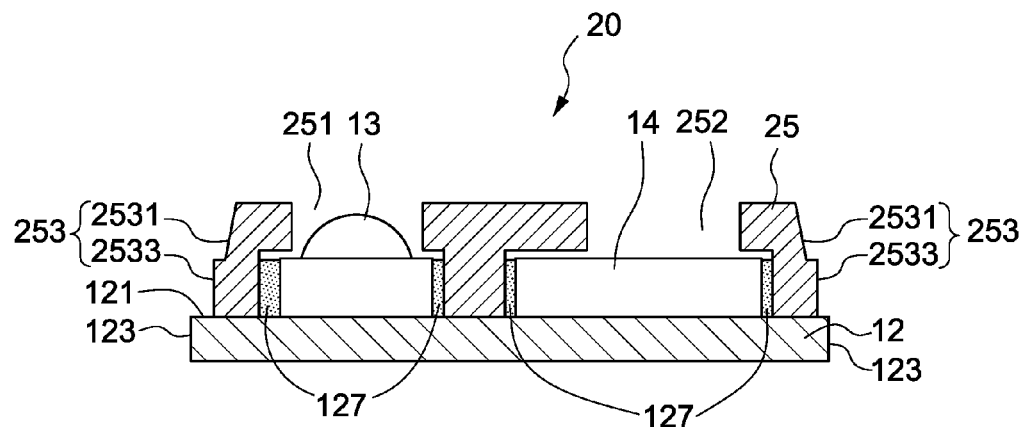
FIG. 1 is a schematic sectional view of an embodiment of an optical module according to the present disclosure.

FIG. 1 is a schematic sectional view of an embodiment of an optical module 20 according to the present disclosure. The optical module 20 includes a carrier 12, a lighting source 13, an optical sensor 14 and a housing 25. The carrier 12 may be or may include, but is not limited to, substrates or printed circuit boards. The carrier 12 may be made of a material that can serve as a carrier. For example, the carrier 12 may include, but is not limited to, organic materials, polymer materials, silicon, silicon dioxide or other silicides. Generally, the carrier 12 has a thickness from approximately 50 micrometers (μm) to approximately 1100 μm. A trace, a wire-bonding pad and/or a via may be included in the carrier 12 or on the carrier 12.

The lighting source 13 and the optical sensor 14 are disposed at an upper surface 121 of the carrier 12. The lighting source 13 may be, for example, a light emitting diode (LED), and the optical sensor 14 may be, for example, a photodiode.

The housing 25 is disposed at the upper surface 121 of the carrier 12, over the lighting source 13 and the optical sensor 14. The housing 25 defines an aperture 251 corresponding to the lighting source 13 such that the lighting source 13 is exposed, and the housing 25 defines an aperture 252 corresponding to the optical sensor 14 such that the optical sensor 14 is exposed. An adhesive 127 is filled between the housing 25 and the lighting source 13 and between the housing 25 and the optical sensor 14, and the adhesive extends to the carrier 12. The housing 25 is firmly affixed to the carrier 12 by the adhesive 127.

An outermost wall of the housing 25 includes an outer sidewall 253 with an inclined portion 2531 and a singulation portion 2533. The singulation portion 2533 is adjacent to the upper surface 121 of the carrier 12 and is substantially perpendicular to the upper surface 121 of the carrier 12. A side 123 of the carrier 12 protrudes approximately 50 μm to approximately 100 μm more than the singulation portion 2533; that is, a distance between two opposite sides 123 of the carrier 12 is greater than a distance between two opposite singulation portions 2533.

The substantially perpendicular singulation portion 2533 provides for a reduced diameter of the housing 25 where the housing 25 attaches to the carrier 12; thus, the optical module 20 may be reduced in size as compared to a housing 25 in which the inclined portion 2531 extends to a lower surface of the housing 25 where the housing 25 attaches to the carrier 12. Additionally, as described below, multiple housings 25 are formed together in a single mold as a housing matrix module and later singulated (resulting in the substantially perpendicular singulation portion 2533). Forming multiple housings 25 in a housing matrix module provides for improved efficiency in transport (handling one molded piece incorporating multiple housings 25 as compared to individual housings 25 to be handled separately), improved efficiency and quality of inspection (inspecting one molded piece rather than separate pieces), reduced damage (e.g., fewer exposed corners to damage), and reduced manufacturing cost.

Figure 2:
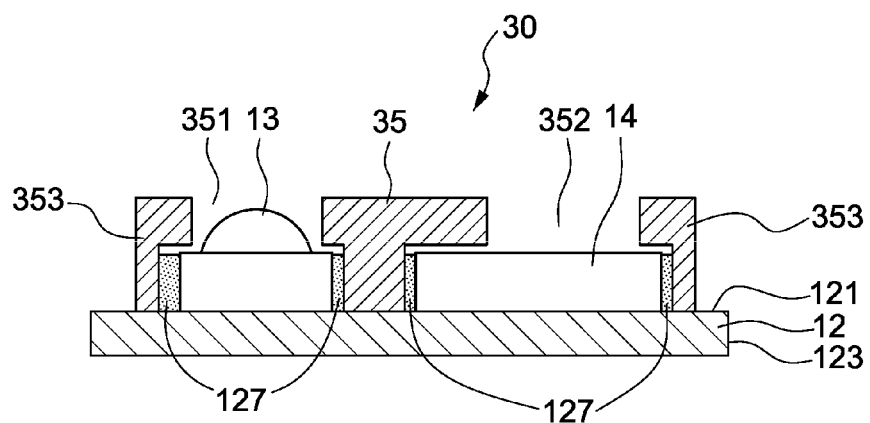
FIG. 2 is a schematic sectional view of an embodiment of an optical module according to the present disclosure.

FIG. 2 is a schematic sectional view of an embodiment of an optical module 30 according to the present disclosure. The optical module 30 is similar to the optical module 20 in FIG. 1, and a difference is that optical module 30 includes a housing 35 where at least one outer sidewall 353 is substantially perpendicular to a lower surface of the housing 35, omitting an inclined portion (e.g., the inclined portion 2531 of the optical module 20 of FIG. 1).

Figure 3:
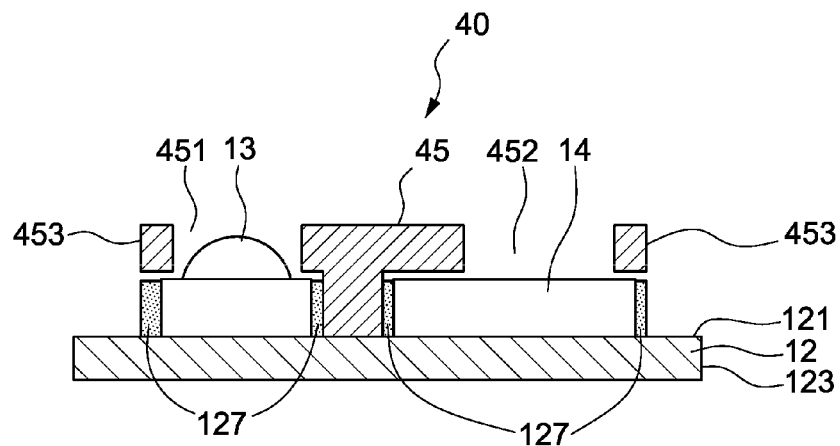
FIG. 3 is a schematic sectional view of an embodiment of an optical module according to the present disclosure.

FIG. 3 is a schematic sectional view of an embodiment of an optical module 40 according to the present disclosure. The optical module 40 is similar to the optical module 30 in FIG. 2, and a difference is that the optical module 40 includes a housing 45 where, in the profile view of FIG. 3, at least one outer sidewall 453 of an outermost wall of the housing 45 extends from a top surface of the housing 45 to a distance above the lighting source 13 and/or to a distance above the optical sensor 14. That is, in the profile view depicted in FIG. 3, the housing 45 does not extend along a side of one or both of the lighting source 13 and the optical sensor 14. It should be understood that the portion of the outermost wall corresponding to the outer sidewall 453 is connected to the housing 45 in areas not illustrated in FIG. 3.

Figure 4:
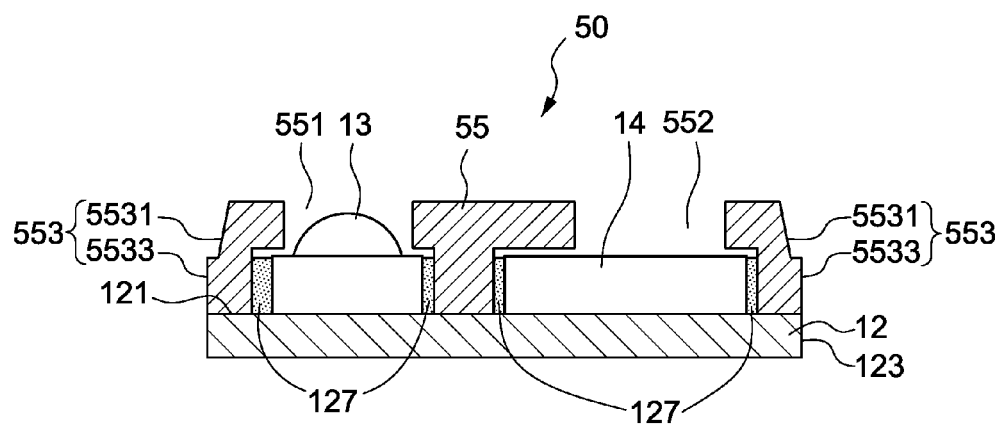
FIG. 4 is a schematic sectional view of an embodiment of an optical module according to the present disclosure.

FIG. 4 is a schematic sectional view of an embodiment of an optical module 50 according to the present disclosure. The optical module 50 is similar to the optical module 20 in FIG. 1, and a difference is that the optical module 50 includes a housing 55, where a singulation portion 5533 of an outer sidewall 553 of the housing 55 is substantially coplanar with a side 123 of the carrier 12. That is, a distance between two opposite sides 123 of the carrier 12 is approximately equal to a distance between two opposite singulation portions 5533.

Figure 5:
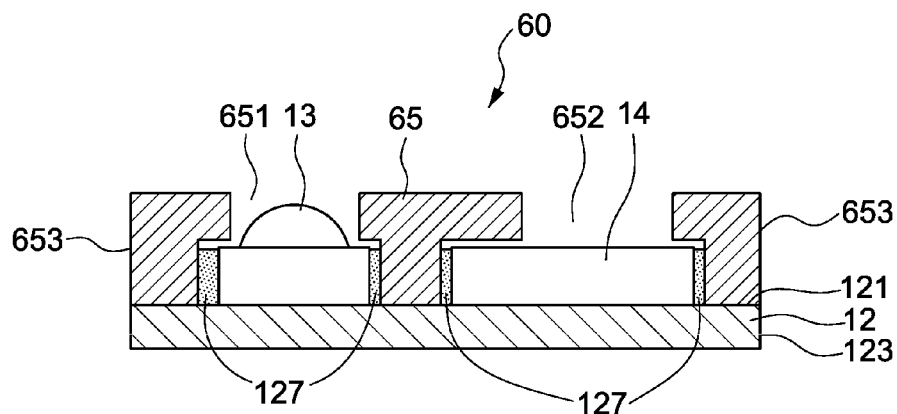
FIG. 5 is a schematic sectional view of an embodiment of an optical module according to the present disclosure.

FIG. 5 is a schematic sectional view of an embodiment of an optical module 60 according to the present disclosure. The optical module 60 is similar to the optical module 30 in FIG. 2, and a difference is that the optical module 60 includes a housing 65, where an outer sidewall 653 of the housing 65 is substantially coplanar with a side 123 of the carrier 12. That is, a distance between two opposite sides 123 of the carrier 12 is approximately equal to a distance between two opposite outer sidewalls 653 of the housing 65.

Figure 6:
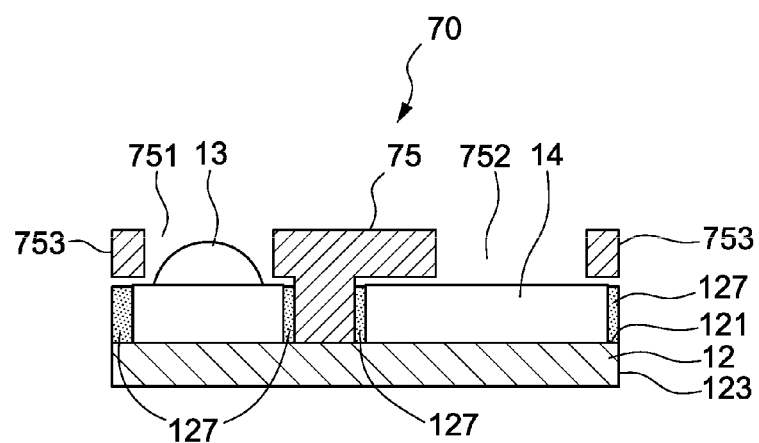
FIG. 6 is a schematic sectional view of an embodiment of an optical module according to the present disclosure.

FIG. 6 is a schematic sectional view of an embodiment of an optical module 70 according to the present disclosure. The optical module 70 is similar to the optical module 40 in FIG. 3, and a difference is that the optical module 70 includes a housing 75, where an outer sidewall 753 of the housing 75 is substantially coplanar with a side 123 of the carrier 12. That is, a distance between two opposite sides 123 of the carrier 12 is approximately equal to a distance between two opposite outer sidewalls 753 of the housing 75.

Figure 7:
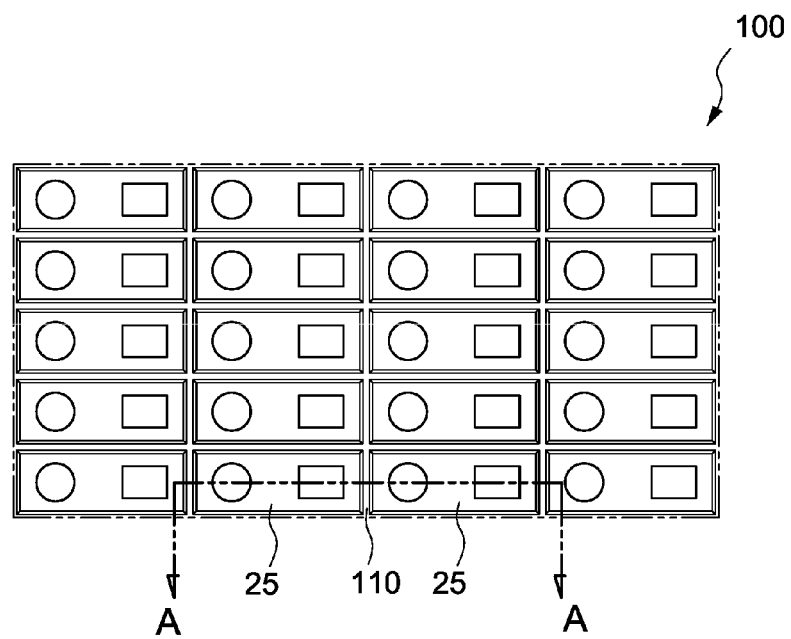
FIG. 7 is a schematic view of a step type housing matrix module according to an embodiment of the present disclosure.
Figure 8:
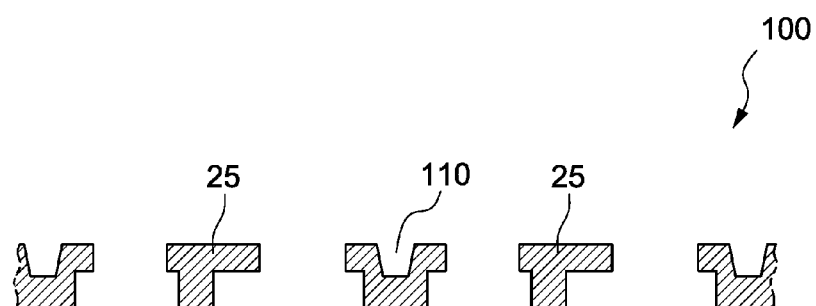
FIG. 8 is an amplified schematic view of an A-A profile of the step type housing matrix module of FIG. 8 according to an embodiment of the present disclosure.

FIGS. 7 and 8 illustrate an example of a step type housing matrix module 100 including multiple housings. For example, the housing matrix module 100 may be used to form the housing 25 of the optical module 20 of FIG. 1 or the housing 55 of the optical module 50 of FIG. 4. The housing 25 of the optical module 20 is discussed with respect to FIGS. 7 and 8 by way of example (with references to component numbering as shown in FIG. 1); however, it should be understood that the discussion applies also to the housing 55 of the optical module 50. FIG. 7 illustrates a top view of the housing matrix module 100 with multiple housings 25 connected together. The housing matrix module 100 may be cut in a process of manufacturing the optical module 20, so that the housings 25 are separated from each other to form individual housings 25. The individual housing 25 formed in this way is different in appearance from a housing made using a single-unit injection mold. A difference is that the housing 25 includes a singulation portion 2533. FIG. 8 is an amplified cross-sectional view along line A-A of FIG. 7. As illustrated in FIG. 8, between adjacent housings 25 in the housing matrix module 100 there is a cut slot 110 with sloped sidewalls; a cutting tool may cut the housing matrix module 100 along the cut slots 110 to separate the housing matrix module 100 into individual housings 25. The outer sidewall 253 of the individual housing 25 includes the inclined portion 2531 formed by the sloped sidewall of the cut slot 110, and the outer sidewall 253 further includes the singulation portion 2533 formed during cutting by the cutting tool. Because the singulation portion 2533 is formed during cutting, a surface of the singulation portion 2533 will exhibit cut marks (not shown), and is rougher than a surface formed by injection molding (e.g., rougher than a surface of a housing formed by a single-unit injection mold).

Figure 9:
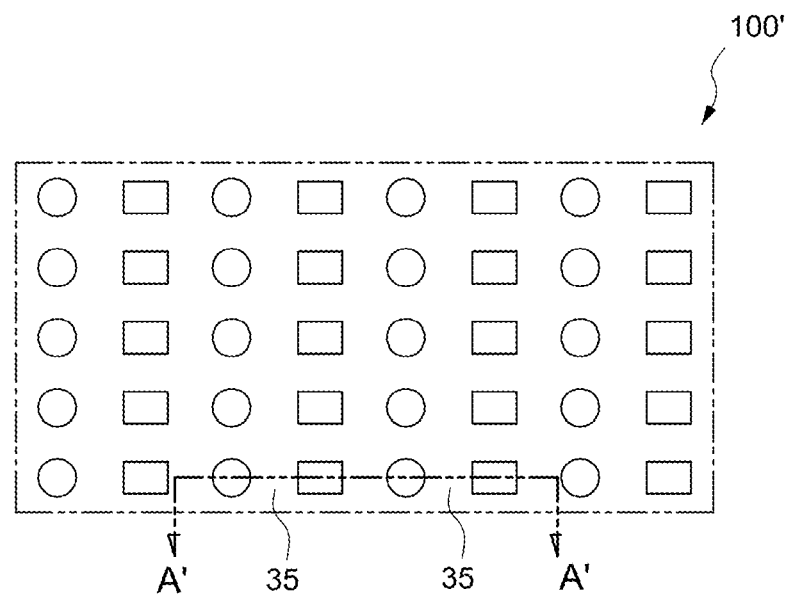
FIG. 9 is a schematic view of a flat type housing matrix module according to an embodiment of the present disclosure.
Figure 10:
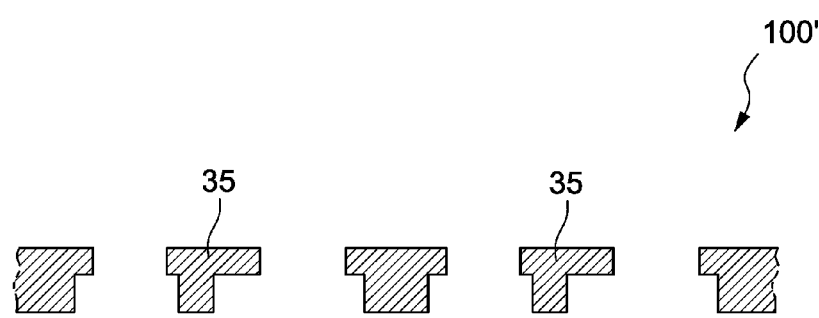
FIG. 10 is an amplified schematic view of an A'-A' profile of the flat type housing matrix module of FIG. 9 according to an embodiment of the present disclosure.

FIGS. 9 and 10 illustrate an example of a flat type housing matrix module 100' including multiple housings. For example, the housing matrix module 100' may be used to form the housing 35 of the optical module 30 of FIG. 2 or the housing 65 of the optical module 60 of FIG. 5. The housing 35 of the optical module 30 is discussed with respect to FIGS. 9 and 10 by way of example (with references to component numbering as shown in FIG. 2); however, it should be understood that the discussion applies also to the housing 65 of the optical module 60. FIG. 9 illustrates a top view of the housing matrix module 100' with multiple housings 35 connected together. The housing matrix module 100' may be cut in a process of manufacturing the optical module 30, so that the housings 35 are separated from each other to form individual housings 35. The individual housing 35 formed in this way is different in appearance from a housing made using a single-unit injection mold. A difference is that the housing 35 includes a singulated outer sidewall 353. FIG. 10 is an amplified cross-sectional view along line A'-A' of FIG. 9. As illustrated in FIG. 10, between adjacent housings 35 in the housing matrix module 100' there is a solid portion; a cutting tool may cut the housing matrix module 100 through the solid portion to separate the housing matrix module 100' into individual housings 35. By the cutting, the outer sidewall 353 is defined; thus, the outer sidewall 353 will exhibit cut marks (not shown), and is rougher than a surface formed by injection molding (e.g., rougher than a surface of a housing formed by a single-unit injection mold).

During a quality inspection, multiple housings 25 or 35 connected with each other in the respective housing matrix module 100 or 100' may be inspected together, reducing inspection time as compared to inspecting individual housings formed by single-unit injection. Further, the inspection quality may be improved, as defects may be more readily apparent in the housing matrix module 100 or 100'. Additionally, as the housing matrix module 100 or 100' includes respective connected multiple housings 25 or 35, the housing matrix module 100 or 100' may be more quickly, efficiently, and conveniently packed and transported; thus, packing and transport time and cost may be reduced.

Figure 11A:
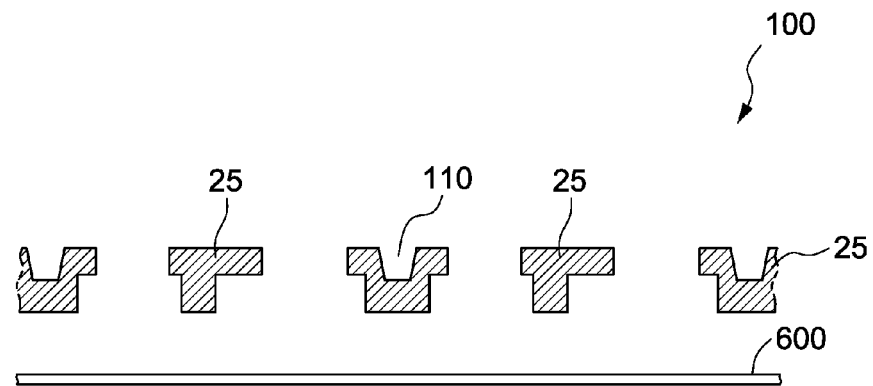
FIGS. 11A, 11B, 11C, 11D, 11E and 11F are schematic views of a manufacturing process according to an embodiment of the present disclosure.
Figure 11B:
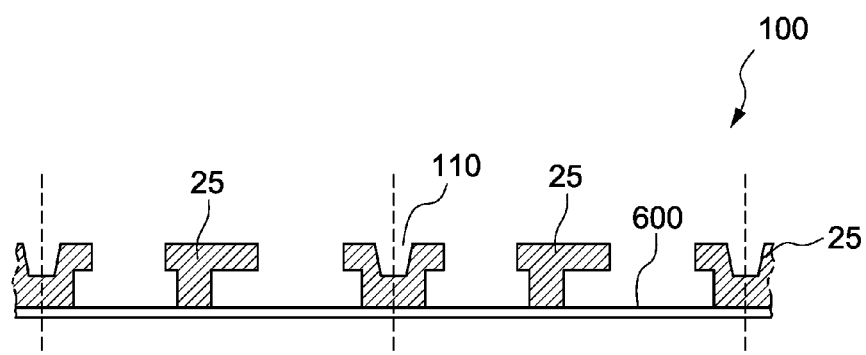
Figure 11C:
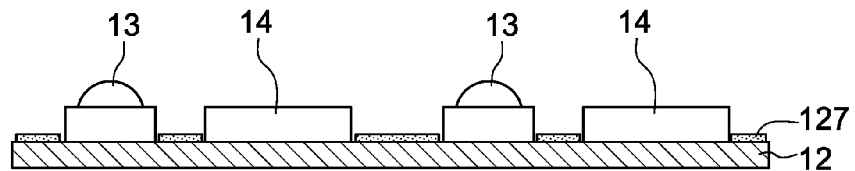
Figure 11D:
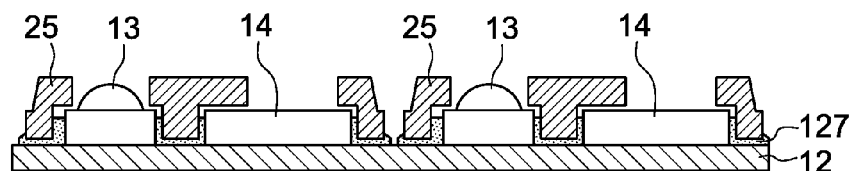
Figure 11E:
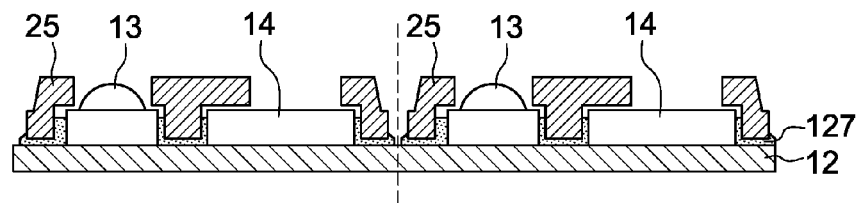
Figure 11F:
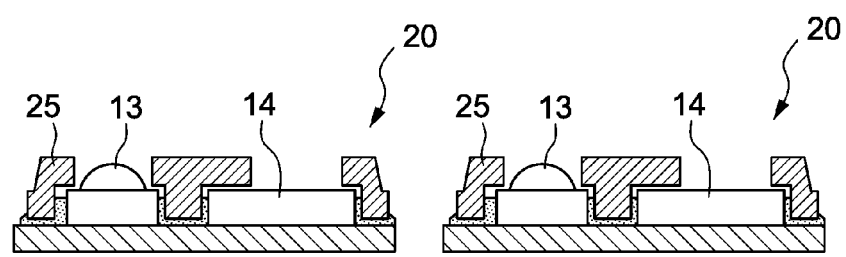

FIGS. 11A-11F illustrate a process of making the optical module 20 shown in FIG. 1. In FIGS. 11A-11B, one or more step type housing matrix modules 100 are affixed to a tape 600 (which may be a strip or wafer-shaped). In FIG. 11B, a cutting machine (not shown) cuts the housing matrix module 100 along cut slots 110 to form multiple individual housings 25, but the cutting is controlled to avoid cutting the tape 600, and the individual housings 25 remain attached to the tape 600. In FIG. 11C, multiple lighting sources 13 and multiple optical sensors 14 are disposed on an upper surface 121 of a carrier 12. Note that disposing the lighting sources 13 and the optical sensors 14 on the upper surface 121 as shown in FIG. 11C may be performed prior to (and indeed, well in advance of) the stages shown in FIGS. 11A and 11B. Further, in one or more embodiments, bonding wires (not shown) may be used to electrically connect ones of the lighting sources 13 and the optical sensors 14 to respective wire-bonding pads (not shown) on the upper surface 121 of the carrier 12. Referring again to FIG. 11C, the lighting sources 13 and the optical sensors 14 are fixed on the upper surface 121 of the carrier 12, such as with a transparent molding material (molding compound). Referring still to FIG. 11C, an adhesive 127 is coated on portions of the upper surface 121 of the carrier 12. In FIG. 11D, the individual housings 25 are removed from the tape 600 and positioned on the upper surface 121 of the carrier 12 (e.g., by a pick and place technique using a die bonder). The individual housings 25 are positioned such that each housing 25 covers one or more of the lighting sources 13 and one or more of the optical sensors 14. The adhesive 127 is heated to a curing temperature and the curing temperature maintained for a period of time sufficient to cure the adhesive 127. In FIG. 11E, a cutting tool (not shown) is used to cut the carrier 12 along cutting lines (e.g., the dotted line in FIG. 11E). Thereby, multiple optical modules 20 are formed, as illustrated in FIG. 11F.

Figure 12A:
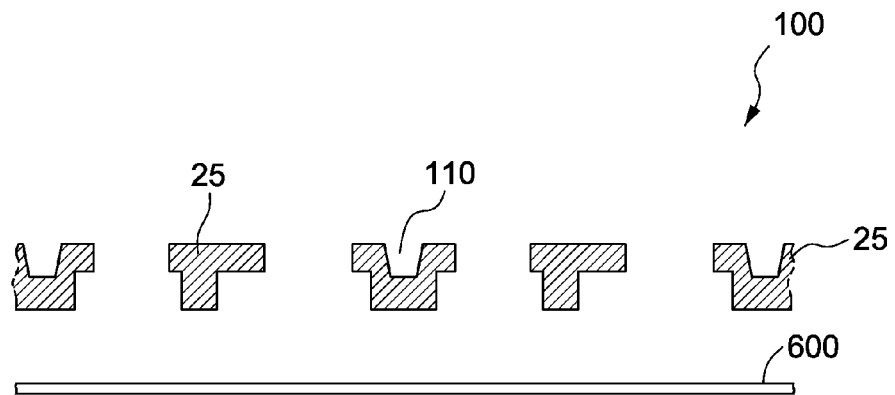
FIGS. 12A, 12B and 12C are schematic views of a manufacturing process according to an embodiment of the present disclosure.
Figure 12B:
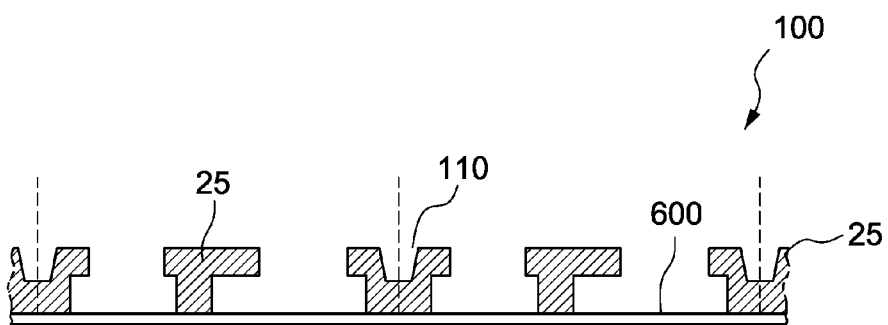
Figure 12C:
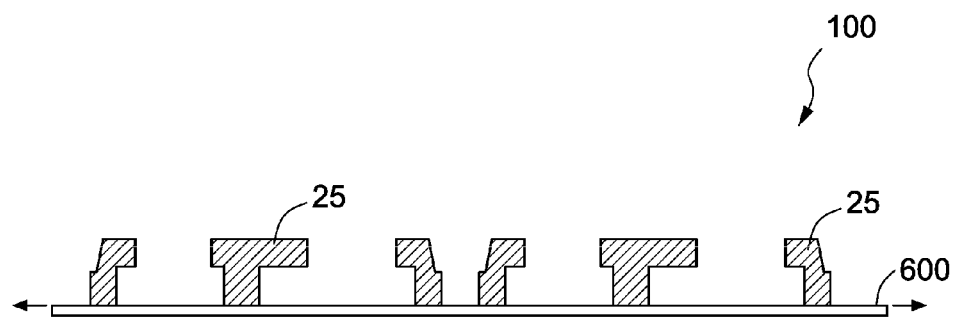

FIGS. 12A-12C illustrate an additional process of making the optical module 20 as shown in FIG. 1. Similar to FIGS. 11A-11B, in FIGS. 12A-12B, one or more step type housing matrix modules 100 are affixed to a wafer-shaped tape 600; and in FIG. 12B, a cutting machine (not shown) cuts the housing matrix module 100 along cut slots 110 to form multiple individual housings 25, but the cutting is controlled to avoid cutting the tape 600, and the individual housings 25 remain attached to the tape 600. Then, in FIG. 12C, the tape 600 is transversely stretched and expanded to increase a distance between adjacent ones of the housings 25 (which are still affixed to the tape 600), such that separating the housings 25 from the tape 600 (e.g., by a pick and place technique using a die bonder) is more convenient and efficient. Following the stage illustrated in FIG. 12C, multiple lighting sources 13, optical sensors 14 and housings 25 are disposed on the carrier 12 and the carrier is cut, similarly as described with respect to FIGS. 11C-11F.

Regarding the manufacturing processes of the optical module 20 as disclosed in FIGS. 11A-11F and 12A-12C, multiple individual housings 25 formed by cutting the housing matrix module 100 are fixed on the carrier 12, and subsequently the carrier 12 is cut to form multiple optical modules 20; therefore, the side 123 of the carrier 12 of the optical module 20 may protrude more than the singulation portion 2533 of the housing 25, as illustrated in FIG. 1.

Also regarding the manufacturing processes of the optical module 20 as disclosed in FIGS. 11A-11F and 12A-12C, because the individual housings 25 are formed by cutting the housing matrix module 100, a wall thickness of an outermost wall of the housing 25 can be designed to be as thin as desired. By way of comparison, walls of a housing formed in a single-unit injection mold have a minimum width imposed by the injection molding process used; further, the shape of a single-unit injection mold housing may include walls inclined from a top surface of the housing to a bottom surface of the housing to facilitate ejection of the housing from the mold, and the inclined walls should have a minimum thickness at the narrowest point (generally, 0.15 mm or greater) to avoid breakage during ejection. The housing 25 thus can be designed and manufactured to have a small diameter as compared to a housing made by single-unit injection molding. For example, the outermost wall of the housing 25 at the singulation portion 2533 can have a thickness less than approximately 0.15 mm, and it has been found that a wall thickness of approximately 0.075 mm does not result in breakage of the housing 25.

Figure 13A:
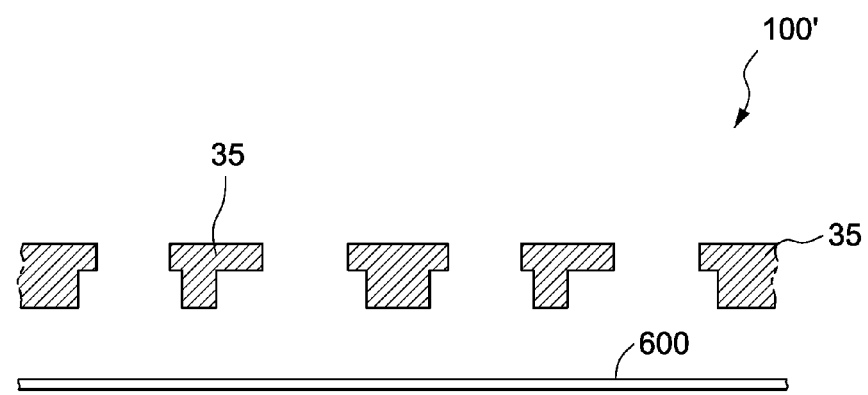
FIGS. 13A, 13B, 13C, 13D, 13E and 13F are schematic views of a manufacturing process according to an embodiment of the present disclosure.
Figure 13B:
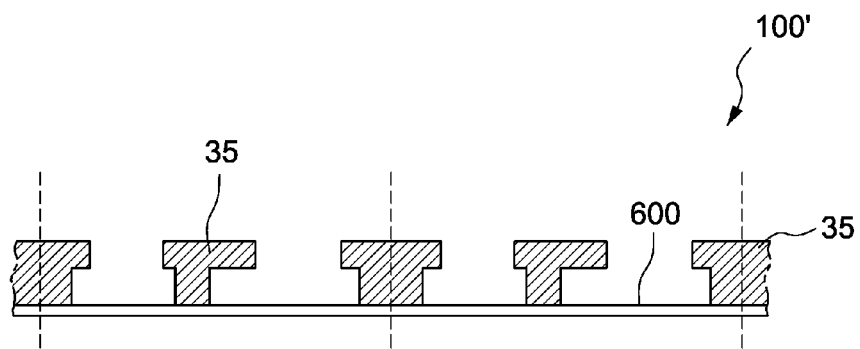
Figure 13C:
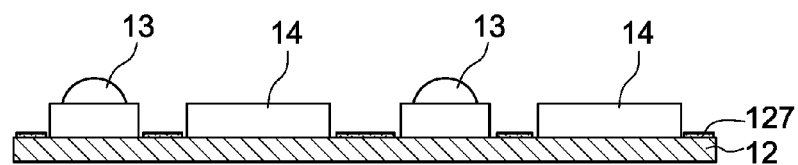
Figure 13D:
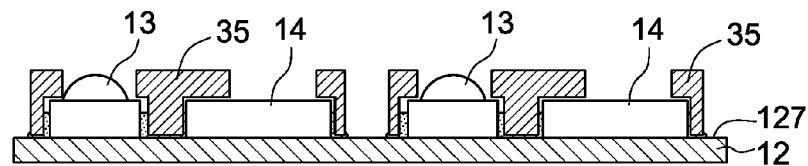
Figure 13E:
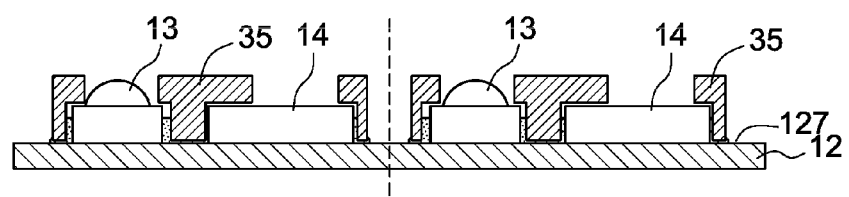
Figure 13F:
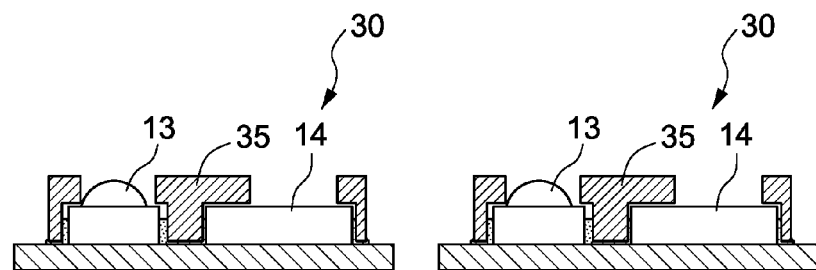

FIGS. 13A-13F illustrate a process of making the optical module 30 shown in FIG. 2. In FIGS. 13A-13B, one or more flat type housing matrix modules 100' are affixed to a tape 600 (which may be a strip or wafer-shaped). In FIG. 13B, a cutting machine (not shown) cuts the housing matrix module 100 along cut slots 110 to form multiple individual housings 35, but the cutting is controlled to avoid cutting the tape 600, and the individual housings 35 remain attached to the tape 600. In FIG. 13C, multiple lighting sources 13 and multiple optical sensors 14 are disposed on an upper surface 121 of a carrier 12. Note that disposing the lighting sources 13 and the optical sensors 14 on the upper surface 121 as shown in FIG. 13C may be performed prior to (and indeed, well in advance of) the stages shown in FIGS. 13A and 13B. Further, in one or more embodiments, bonding wires (not shown) may be used to electrically connect ones of the lighting sources 13 and the optical sensors 14 to respective wire-bonding pads (not shown) on the upper surface 121 of the carrier 12. Referring again to FIG. 13C, the lighting sources 13 and the optical sensors 14 are fixed on the upper surface 121 of the carrier 12, such as with a transparent molding material (molding compound). Referring still to FIG. 13C, an adhesive 127 is coated on portions of the upper surface 121 of the carrier 12. In FIG. 13D, the individual housings 35 are removed from the tape 600 and positioned on the upper surface 121 of the carrier 12 (e.g., by a pick and place technique using a die bonder). The individual housings 35 are positioned such that each housing 35 covers one or more of the lighting sources 13 and one or more of the optical sensors 14. The adhesive 127 is heated to a curing temperature and the curing temperature maintained for a period of time sufficient to cure the adhesive 127. In FIG. 13E, a cutting tool (not shown) is used to cut the carrier 12 along cutting lines (e.g., the dotted line in FIG. 13E). Thereby, multiple optical modules 30 are formed, as shown in FIG. 13F.

Figure 14A:
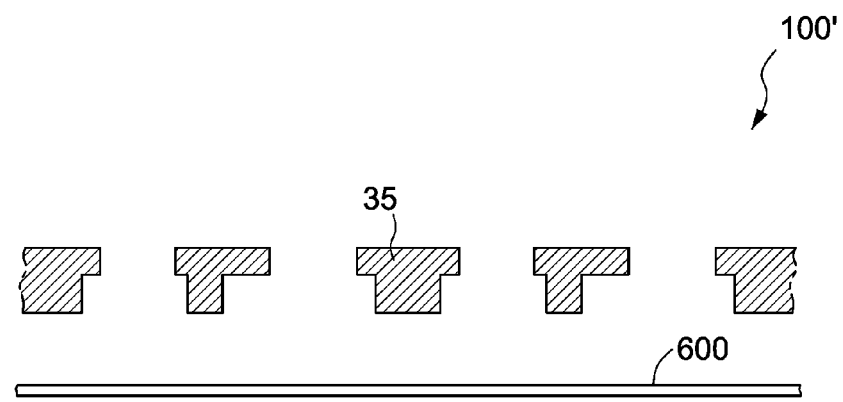
FIGS. 14A, 14B and 14C are schematic views of a manufacturing process according to an embodiment of the present disclosure.
Figure 14B:
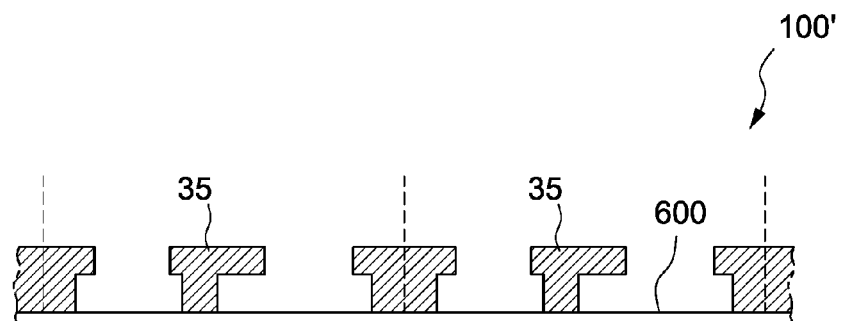
Figure 14C:
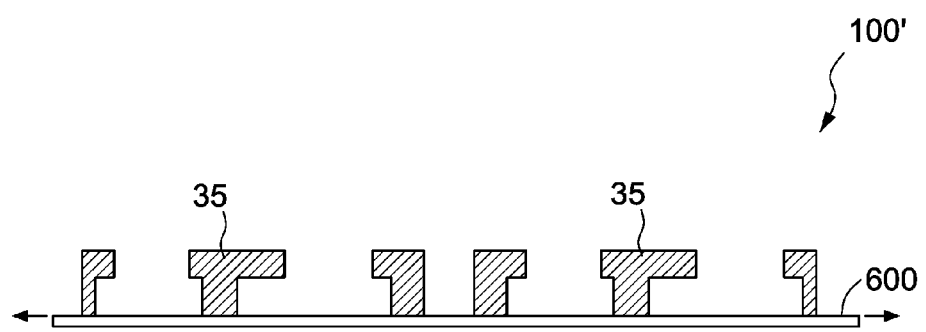

FIGS. 14A-14C illustrate an additional process of making the optical module 30 as shown in FIG. 2. Similar to FIGS. 13A-13B, in FIGS. 14A-14B, one or more flat type housing matrix modules 100 are affixed to a wafer-shaped tape 600; and in FIG. 14B, a cutting machine (not shown) cuts the housing matrix module 100 along cut slots 110 to form multiple individual housings 35, but the cutting is controlled to avoid cutting the tape 600, and the individual housings 35 remain attached to the tape 600. Then, in FIG. 14C, the tape 600 is transversely stretched and expanded to increase a distance between adjacent ones of the multiple housings 35 (which are still affixed to the tape 600), such that separating the housings 35 from the tape 600 (e.g., by a pick and place technique using a die bonder) is more convenient and efficient. Following the stage illustrated in FIG. 14C, multiple lighting sources 13, optical sensors 14 and housings 25 are disposed on the carrier 12 and the carrier is cut, similarly as described with respect to FIGS. 13C-13F.

Regarding the manufacturing processes of the optical module 30 disclosed in FIGS. 13A-13F and 14A-14C, multiple individual housings 35 formed by cutting the housing matrix module 100' are fixed on the carrier 12, and subsequently the carrier 12 is cut to form multiple optical modules 20; therefore, the side 123 of the carrier 12 of the optical module 30 may protrude more than the outer sidewall 353 of the housing 35, as illustrated in FIG. 2.

Also regarding the manufacturing processes of the optical module 30 disclosed in FIGS. 13A-13F and 14A-14C, because the individual housings 35 are formed by cutting the housing matrix module 100', a wall thickness of an outermost wall of the housing 35 can be designed to be as thin as desired. The housing 35 thus can be designed and manufactured to have a small diameter as compared to a housing made by single-unit injection molding. For example, the outermost wall of the housing 35 can have a thickness less than approximately 0.15 mm, and it has been found that a wall thickness of approximately 0.075 mm does not result in breakage of the housing 35.

The wall thickness of the outermost wall of the respective housing 25 or 35 can be made as thin as desired using the processes in FIGS. 11A-11F, 12A-12C, 13A-13F and 14A-14C. The wall thickness may be equal to zero, such that the optical module 40 in FIG. 3 is made. It should be noted that, with respect to the optical module 40 in FIG. 3, the portion 453 is connected elsewhere on the housing 45, in a portion other than shown in the profile view of FIG. 3.

A benefit of the processes of FIGS. 11A-11F, 12A-12C, 13A-13F and 14A-14C is that a pick and place technique may be used to remove the housings 25 or 35 from the tape 600 and place the housings 25 or 35 on the carrier 12, as compared to feeding single-unit injection housings through a bowl feeder. Thus, collisions of the housings with foreign materials or other housings or devices in the bowl feeder, which can cause damage to the housings, is avoided. Additionally, the processes of FIGS. 11A-11F, 12A-12C, 13A-13F and 14A-14C are faster than the use of the bowl feeder, and are more precise in terms of both picking (thereby avoiding a mechanical gripper scratching the housings) and placing. The manufacturing processes of FIGS. 12A-12C and 14A-14C, in which the tape 600 is stretched and expanded to further distance the housings 25 or 35 from each other, can make the pick-and-place operation more efficient.

Figure 15A:
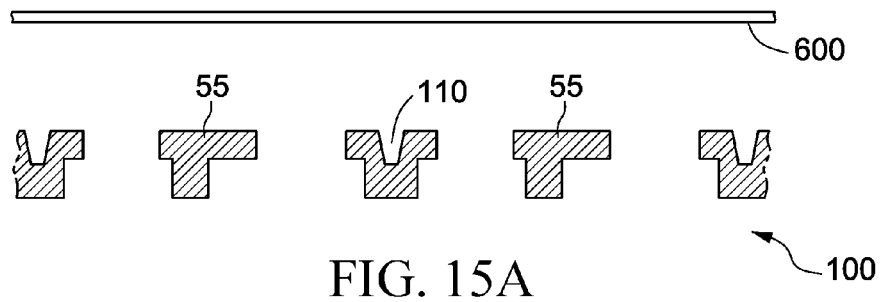
FIGS. 15A, 15B, 15C, 15D, 15E and 15F are schematic views of a manufacturing process according to an embodiment of the present disclosure.
Figure 15B:
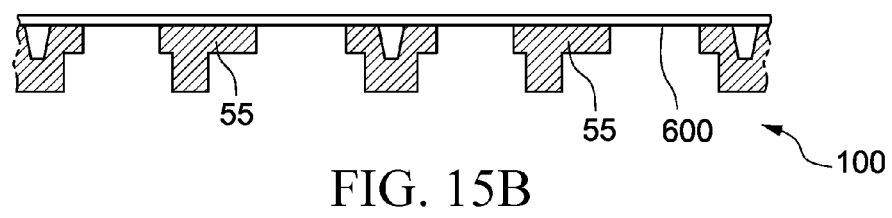
Figure 15C:
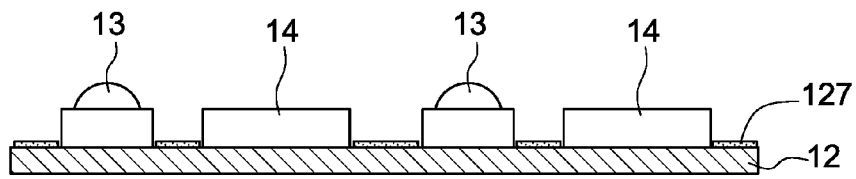
Figure 15D:
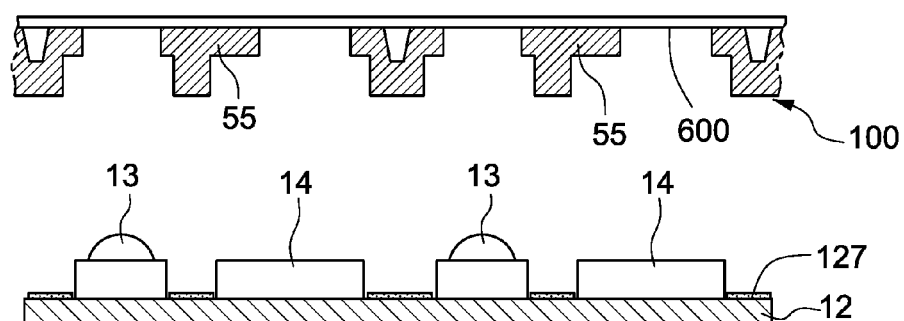
Figure 15E:
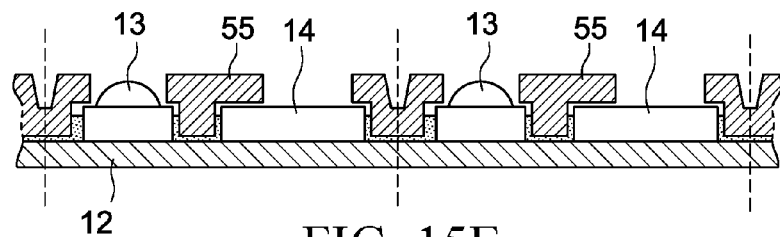
Figure 15F:
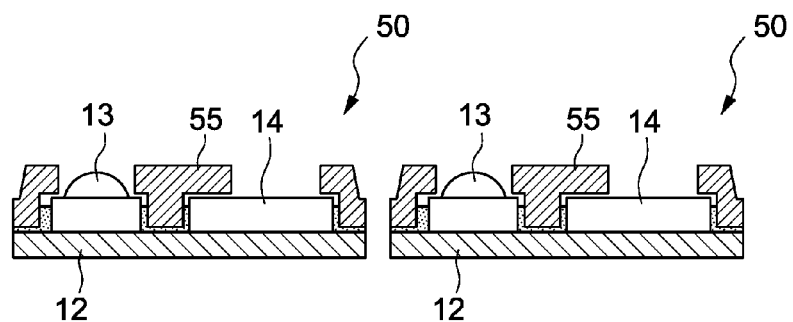

FIGS. 15A-15F illustrate a process of making the optical module 50 shown in FIG. 4. In FIGS. 15A-15B, one or more step type housing matrix modules 100 are affixed to a tape 600 (which may be a strip or wafer-shaped). In one or more embodiments, the tape 600 is affixed to a top surface of the housing matrix module 100, and covers a cut slot 110. In FIG. 15C, multiple lighting sources 13 and multiple optical sensors 14 are disposed on an upper surface 121 of a carrier 12. Note that disposing the lighting sources 13 and the optical sensors 14 on the upper surface 121 as shown in FIG. 15C may be performed prior to (and indeed, well in advance of) the stages shown in FIGS. 15A and 15B. Further, in one or more embodiments, bonding wires (not shown) may be used to electrically connect ones of the lighting sources 13 and the optical sensors 14 to respective wire-bonding pads (not shown) on the upper surface 121 of the carrier 12. Referring again to FIG. 15C, the lighting sources 13 and the optical sensors 14 are fixed on the upper surface 121 of the carrier 12, such as with a transparent molding material (molding compound). Referring still to FIG. 15C, an adhesive 127 is coated on portions of the upper surface 121 of the carrier 12. In FIG. 15D, the housing matrix module 100 affixed to the tape 600 is affixed to the upper surface 121 of the carrier 12, and the housings 55 are positioned such that each housing 55 covers one or more of the lighting sources 13 and one or more of the optical sensors 14. The adhesive 127 is heated to a curing temperature and the curing temperature maintained for a period of time sufficient to cure the adhesive 127. In FIG. 15E, the tape 600 is removed, and a cutting tool (not shown) is used to cut the housing matrix module 100 and the carrier 12 along cutting lines (e.g., the dotted line in FIG. 15E). Thereby, as shown in FIG. 15F, multiple optical modules 50 are formed.

Regarding the manufacturing process of the optical module 50 disclosed in FIGS. 15A-15F, because the housing matrix module 100 is first affixed to the carrier 12, and then the housing matrix module 100 and the carrier 12 are cut to form multiple optical modules 50, a side 123 of the carrier 12 of the optical module 50 is substantially coplanar with a singulation portion 5533 of the housing 55 (referring to FIG. 4), allowing for a reduced diameter of the housing 55 and a corresponding reduced diameter of the optical module 50.

Also regarding the manufacturing processes of the optical module 50 disclosed in FIGS. 15A-15F, because the individual housings 55 are formed by cutting the housing matrix module 100, a wall thickness of an outermost wall of the housing 55 can be designed to be as thin as desired. The housing 55 thus can be designed and manufactured to have a small diameter as compared to a housing made by single-unit injection molding. For example, the outermost wall of the housing 55 can have a thickness less than approximately 0.15 mm, and it has been found that a wall thickness of approximately 0.075 mm does not result in breakage of the housing 55.

Figure 16A:
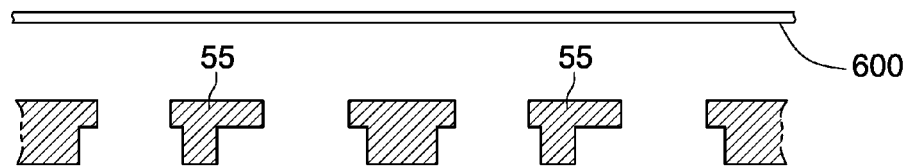
FIGS. 16A, 16B, 16C, 16D, 16E and 16F are schematic views of a manufacturing process according to an embodiment of the present disclosure.
Figure 16B:
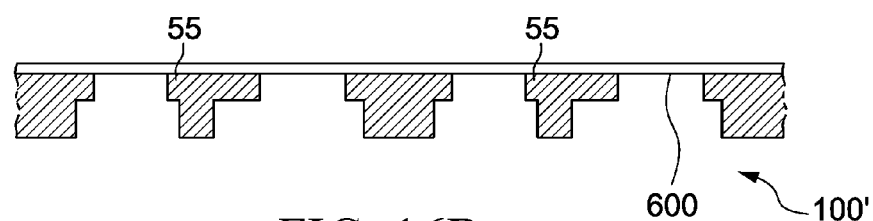
Figure 16C:
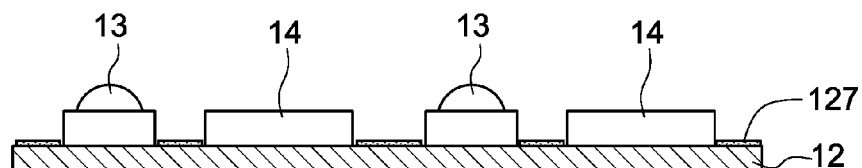
Figure 16D:
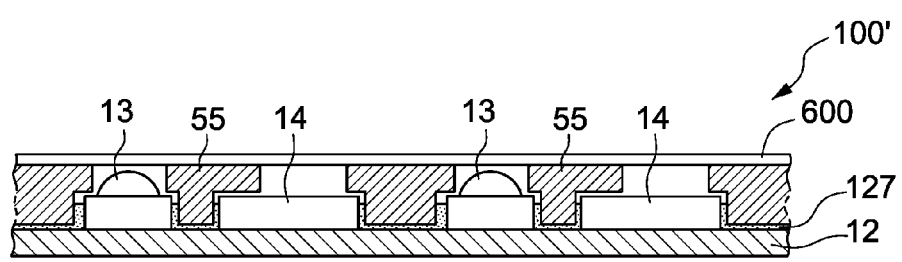
Figure 16E:
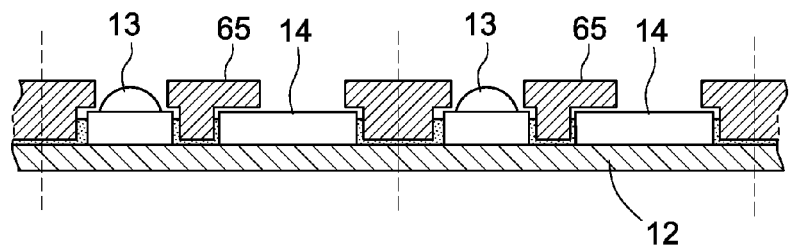
Figure 16F:
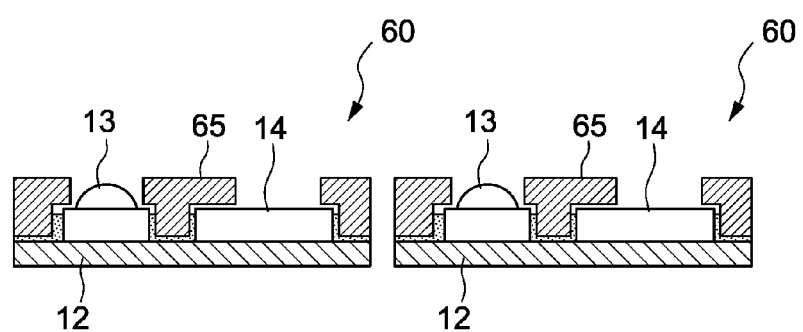

FIGS. 16A-16F illustrate a process of making the optical module 60 shown in FIG. 5. In FIGS. 16A-16B, one or more flat type housing matrix modules 100' are affixed to a tape 600 (which may be a strip or wafer-shaped). In one or more embodiments, the tape 600 is affixed to a top surface of the housing matrix module 100'. In FIG. 16C, multiple lighting sources 13 and multiple optical sensors 14 are disposed on an upper surface 121 of a carrier 12. Note that disposing the lighting sources 13 and the optical sensors 14 on the upper surface 121 as shown in FIG. 16C may be performed prior to (and indeed, well in advance of) the stages shown in FIGS. 16A and 16B. Further, in one or more embodiments, bonding wires (not shown) may be used to electrically connect ones of the lighting sources 13 and the optical sensors 14 to respective wire-bonding pads (not shown) on the upper surface 121 of the carrier 12. Referring again to FIG. 16C, the lighting sources 13 and the optical sensors 14 are fixed on the upper surface 121 of the carrier 12, such as with a transparent molding material (molding compound). Referring still to FIG. 16C, an adhesive 127 is coated on portions of the upper surface 121 of the carrier 12. In FIG. 16D, the housing matrix module 100' affixed to the tape 600 is affixed to the upper surface 121 of the carrier 12, and the housings 65 are positioned such that each housing 65 covers one or more of the lighting sources 13 and one or more of the optical sensors 14. The adhesive 127 is heated to a curing temperature and the curing temperature maintained for a period of time sufficient to cure the adhesive 127. In FIG. 16E, the tape 600 is removed, and a cutting tool (not shown) is used to cut the housing matrix module 100' and the carrier 12 along cutting lines (e.g., the dotted line in FIG. 16E). Thereby, as shown in FIG. 16F, multiple optical modules 60 are formed.

Regarding the manufacturing process of the optical module 60 in FIGS. 16A-16F, because the housing matrix module 100' is first affixed to the carrier 12, and then the housing matrix module 100' and the carrier 12 are cut to form multiple optical modules 60, a side 123 of the carrier 12 of the optical module 60 is substantially coplanar with a sidewall 753 of the housing 65 (referring to FIG. 5), allowing for a reduced diameter of the housing 65 and the optical module 60.

Also regarding the manufacturing processes of the optical module 60 disclosed in FIGS. 16A-16F, because the individual housings 65 are formed by cutting the housing matrix module 100', a wall thickness of an outermost wall of the housing 65 can be designed to be as thin as desired. The housing 65 thus can be designed and manufactured to have a small diameter as compared to a housing made by single-unit injection molding. For example, the outermost wall of the housing 65 can have a thickness less than approximately 0.15 mm, and it has been found that a wall thickness of approximately 0.075 mm does not result in breakage of the housing 65.

The wall thickness of the outermost wall of the respective housing 55 or 65 can be made as thin as desired using the processes in FIGS. 15A-15F and 16A-16F. The wall thickness may be equal to zero, such that the optical module 70 in FIG. 6 is made.

A benefit of the processes of FIGS. 15A-15F and 16A-16F is that the housing matrix module 100 or 100' including multiple housings 55, 65 or 75 may be assembled onto the carrier 12 as a unit, as compared to feeding single-unit injection housings through a bowl feeder. Thus, collisions of the housings with foreign materials or other housings or devices in the bowl feeder, which can cause damage to the housings, is avoided. Additionally, the processes of FIGS. 15A-15F and 16A-16F are faster than the use of the bowl feeder, and are more precise in terms of placing the housings 55, 65 or 75 accurately.

Figure 17A:
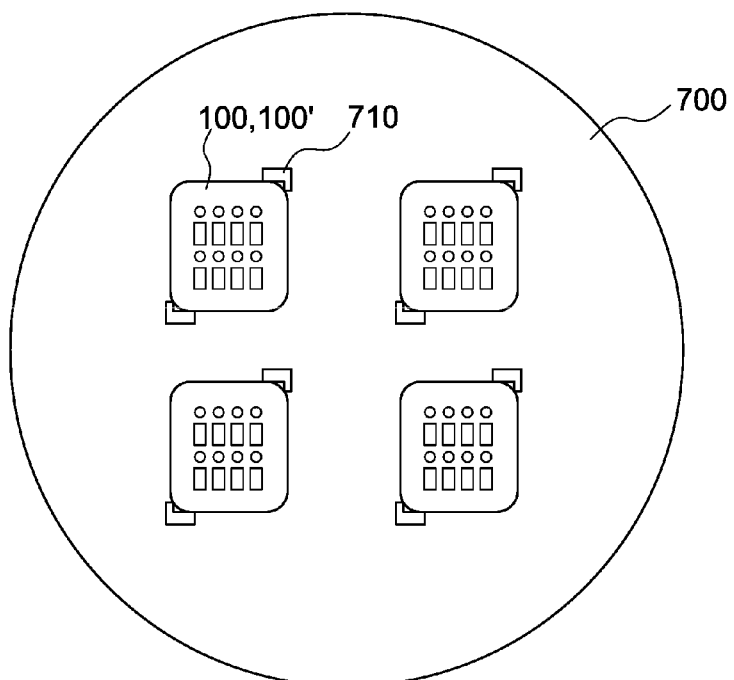
FIGS. 17A and 17B are schematic views of affixing multiple housing matrix modules to a tape.
Figure 17B:
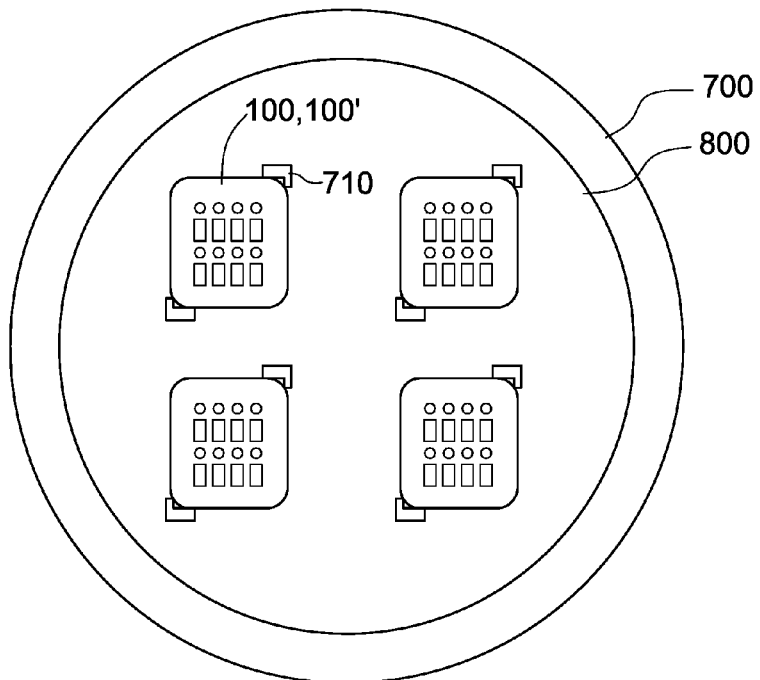

FIGS. 17A-17B illustrate that, for the manufacturing processes disclosed in FIGS. 11A-11F, 12A-12C, 13A-13F, 14A-14C, 15A-15F and 16A-16F, multiple housing matrix modules 100 or 100' can be affixed to a tape, followed by the subsequent stages of making the respective optical modules 20, 30, 40, 50, 60 or 70. In FIG. 17A, multiple positioning marks 710 are marked on a jig 700, and multiple housing matrix modules 100 or 100' are placed on the jig 700 and are respectively aligned with the multiple positioning marks 710. In FIG. 17B, a tape 800 is bonded to the multiple housing matrix modules 100 or 100'. The tape 800 is illustrated as being formed of a clear material; however, tape 800 may be another material. The tape 800 is an example of the tape 600 of the processes described above. Subsequently to FIG. 17B, manufacturing continues as described with respect to FIGS. 11B-11F, 12B-12C, 13B-13F, 14B-14C, 15C-15F or 16C-16F.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "substantially" and "approximately" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

For example, "substantially perpendicular" can refer to a range of variation of less than or equal to ±10% of 90°, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 µm, no greater than 2 µm, no greater than 1 µm, or no greater than 0.5 µm.

Two (positive) numerical values can be deemed to be approximately equal if a difference between the values is less than or equal to 10% of an average of the values, such as less than or equal to 5%, less than or equal to 4%, less than or equal to 3%, less than or equal to 2%, less than or equal to 1%, less than or equal to 0.5%, less than or equal to 0.1%, or less than or equal to 0.05%.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

What is claimed is:

1. An optical module, comprising:
   a carrier;
   a light source disposed on an upper side of the carrier;
   an optical sensor disposed on the upper side of the carrier; and
   a housing disposed on the upper side of the carrier over the light source and the optical sensor, the housing defining a first aperture exposing at least a portion of the light source and defining a second aperture exposing at least a portion of the optical sensor, an outer sidewall of the housing comprising at least one singulation portion adjacent to the upper side of the carrier and substantially perpendicular to the upper side of the carrier,
   wherein the first aperture defines a first space between the housing and the light source and the second aperture defines a second space between the housing and the optical sensor;
   wherein the singulation portion of the housing is a first portion of the housing, the housing further comprises a second portion, and a surface of the singulation portion of the housing is rougher than a surface of the second portion of the housing.

2. The optical module according to claim 1, wherein the outer sidewall has at least one outer side surface fully formed by the singulation portion.

3. The optical module according to claim 1, wherein the carrier is a substrate.

4. The optical module according to claim 1, wherein the at least one singulation portion is two singulation portions on opposite sides of the optical module, and a distance between two opposite sides of the carrier is greater than a distance between the two singulation portions.

5. The optical module according to claim 1, wherein the at least one singulation portion is two singulation portions on opposite sides of the optical module, and a distance between two opposite sides of the carrier is approximately equal to a distance between two singulation portions of the housing.

6. The optical module according to claim 1, wherein a wall thickness of the outer sidewall of the housing at the singulation portion is less than 0.15 mm.

7. The optical module according to claim 6, wherein the wall thickness is approximately 0.075 mm.

8. The optical module according to claim 1, wherein the outer sidewall of the housing extends from the top surface of the housing to a position above the light source or to a position above the optical sensor.

9. The optical module according to claim 1, further comprising an adhesive filled in at least one of the first space or the second space.

10. The optical module according to claim 9, wherein the adhesive is located between a bottom side of the housing and the upper side of the carrier.

11. The optical module according to claim 1, further comprising an adhesive disposed in at least of the first space and second space.

12. The optical module according to claim 11, wherein the housing has a bottom side and the adhesive is disposed between the bottom side of the housing and the upper side of the carrier.

13. The optical module according to claim 1, wherein the outer sidewall of the housing comprises at least two singulation portions, including the at least one singulation portion, disposed on opposite sides of the optical module.

14. A method of making an optical module, comprising:
   (a) affixing at least one housing matrix module to a tape, the housing matrix module comprising a plurality of housings connected with each other, each housing defining a plurality of apertures;
   (b) singulating the housing matrix module to separate the housings from each other, leaving the housings attached to the tape, wherein the singulating defines a singulation portion on an outer sidewall of each of the housings;
   (c) disposing a plurality of lighting sources and a plurality of optical sensors at an upper side of a carrier;
   (d) disposing the singulated housings on the upper side of the carrier, each housing positioned over at least one lighting source and at least one optical sensor such that the lighting source is exposed from a first aperture defined by the housing and the optical sensor is exposed from a second aperture defined by the housing, wherein the first aperture defines a first space between housing and the lighting source and the second aperture defines a second space between the housing and the optical sensor, and
   (e) singulating the carrier into a plurality of optical modules, the singulation portion being disposed on an upper surface of the carrier and perpendicular to the upper surface of the carrier.

15. The method according to claim 14, wherein the at least one housing matrix module is a plurality of housing matrix modules, and (a) comprises concurrently affixing the plurality of housing matrix modules to the tape.

16. The method according to claim 14, wherein after (b) and before (d), the method further comprises stretching the tape.

17. The method according to claim 14, wherein in (b), the singulating is performed by cutting between housings through slots defined by the housing matrix module.

18. The method according to claim 14, further comprising, after (c), applying an adhesive to portions of the upper surface of the carrier, wherein in (d), the housings are disposed on the adhesive.

19. The method according to claim 14, further comprising, after (c), applying an adhesive to at least one of the first space or the second space.

20. The method according to claim 19, wherein the adhesive is located between a bottom side of the housing and the upper side of the carrier.

21. A method of making an optical module, comprising:
(a) affixing at least one housing matrix module to a tape, the housing matrix module comprising a plurality of housings connected with each other, each housing defining a plurality of apertures;
(b) disposing a plurality of lighting sources and a plurality of optical sensors at an upper side of a carrier;
(c) disposing the housing matrix module at the upper side of the carrier, the housings of the housing matrix module positioned such that a first aperture of each housing exposes at least one lighting source and a second aperture of each housing exposes at least one optical sensor, wherein the first aperture defines a first space between the housing and the lighting source and the second aperture defines a second space between the housing and the optical sensor;
(d) singulating the housing matrix module and the carrier to form a plurality of optical modules each comprising one housing, the one housing including a singulation portion of an outer wall of the housing, the singulation portion being disposed on an upper surface of the carrier and perpendicular to the upper surface of the carrier.

22. The method according to claim 21, wherein the at least one housing matrix module is a plurality of housing matrix modules, further comprising in (a) concurrently affixing the plurality of housing matrix modules to the tape.

23. The method according to claim 21, wherein in (d), the singulating is performed by cutting between housings through slots defined by the housing matrix module.

24. The method according to claim 21, further comprising before (c) applying an adhesive to an upper surface of the carrier, wherein in (c) the housings are disposed on the adhesive.

25. The method according to claim 21, further comprising before (d) removing the tape.

26. The method according to claim 21, further comprising before (c) applying an adhesive to at least one of the first space or the second space.

27. The method according to claim 26, wherein the adhesive is located between a bottom side of the housing and the upper side of the carrier.

* * * * *